Patented Feb. 20, 1923.

1,446,012

UNITED STATES PATENT OFFICE.

GEORGE KOLSKY, OF MAMARONECK, NEW YORK.

PROCESS OF PREPARING OXALIC ACID.

No Drawing.  Application filed December 16, 1921. Serial No. 522,778.

*To all whom it may concern:*

Be it known that I, GEORGE KOLSKY, a citizen of Switzerland, and resident of Mamaroneck, county of Westchester, and State of New York, have invented certain new and useful Improvements in Processes of Preparing Oxalic Acid, of which the following is a specification.

My present invention relates to the preparation of oxalic acid from carbohydrates by means of nitric acid, and has for its object to carry out the treatment in a very economical manner, with a high yield of a pure product. For this purpose, the reaction is made to take place in the presence of phosphoric acid and preferably of a catalyzer.

The carbohydrate employed may be cane sugar ($C_{12}H_{12}O_{11}$), other sugars or mixtures thereof, glucose, starch, dextrin, etc. The catalyzer is preferably vanadium pentoxid ($V_2O_5$), but other vanadium compounds and other catalytic agents may be used, for instance salts of molybdenum or of manganese.

The procedure may be as follows:

Into an aqueous solution of phosphoric acid ($H_3PO_4$), for instance a 50% solution, I introduce continuously or from time to time, the carbohydrate material and simultaneously nitric acid ($HNO_3$) of any strength, in quantities equivalent to the carbohydrate introduced per unit of time. As an example, the reaction mixture may contain about equal amounts (by weight) of water, nitric anhydrid ($N_2O_5$) and phosphoric anhydrid ($P_2O_5$).

The reaction is carried out with or without the addition of vanadium pentoxid ($V_2O_5$) or other catalyzers, but preferably in the presence of a catalytic agent, at suitable temperatures (ordinary temperatures of from 30° to 70° centigrade will generally be employed) and the result is the oxidation of the carbohydrate to form oxalic acid ($C_2H_2O_4 + 2H_2O$), fumes of nitrogen oxid (NO) and of nitrogen dioxid ($NO_2$) being given off at the same time, the reaction being performed in a treatment vessel which prevents the escape of said fumes into the room in which the attendants are working. In addition to the fumes and to the oxalic acid, there results a spent liquor which contains phosphoric acid more highly diluted than the original phosphoric acid, also traces of nitric acid and of oxalic acid.

The mixture of oxalic acid and spent liquor is then cooled (for instance to 15° centigrade) and thereupon the oxalic acid and the spent liquor are separated from each other in any suitable manner, for instance by centrifugal action or by filtration, the oxalic acid thus obtained being marketable as it is, or after the usual manipulations (drying, etc.).

The separated spent liquor is heated (for instance to about 50° or 60° centigrade) and at the same time air is blown into or through such liquor. The air takes with it any traces of nitric and nitrous fumes ($NO_2$ and NO) present in said liquor, and this step of the process may therefore be termed a denitration. The denitrated spent liquor consists chiefly of dilute phosphoric acid free from nitric and nitrous fumes and therefore eminently suitable for use as an absorbent in the reconstitution of the original treatment liquid, that is, of the mixture of phosphoric and nitric acids.

This reconstitution is effected by bringing into absorptive contact with the denitrated spent liquor, the fumes (of NO and $NO_2$) from the treatment vessel and from the denitrating operation, together with the air from that operation, and with any additional air that may be required to effect the reconstitution of the nitric acid. This absorption or reconstitution step is carried out in any suitable manner, for instance in the well-known way of discharging a spray of the absorbing liquid (the denitrated spent liquor) into an atmosphere or current of the fumes and air. The liquid thus reconstituted (aqueous mixture of phosphoric and nitric acids) is used for the treatment of further amounts of carbohydrate.

The advantages of my improved process are as follows: It is possible to effect a very considerable economy in view of the fact that only the theoretically required quantity of nitric acid need be used, whereas an excess of nitric acid must be employed in all former processes of this type known to me. Again, very weak nitric acid may be used successfully in my process, whereas the processes proposed hitherto require relatively strong acid. Furthermore, the spent liquor (especially after it has been denitrated) has a maximum absorptive capacity for NO and $NO_2$ fumes, since (consisting chiefly of dilute phosphoric acid) it does not itself develop any fumes which would interfere with the absorption of NO and NO$_2$. Phosphoric acid also presents a further very important advantage over sulphuric acid (which has been proposed as an admixture to nitric acid in the manufacture of oxalic acid from carbohydrates) in that with phosphoric acid there is no risk of carrying the reaction so far as to cause the carbohydrate material to be oxidized to carbon dioxid instead of to oxalic acid. For the same reason, the reaction in the treatment vessel is readily controlled, whereas this is practically impossible when sulfuric acid is used in lieu of phosphoric, since with a mixture of nitric and sulfuric acids the reaction is extremely violent and dangerous.

The denitration step of my process referred to above is accomplished by the presence of phosphoric acid, without any necessity of adding water or other reagents which are required when denitrating spent liquors containing sulfuric acid. Thus my process not only simplifies the denitration, but eliminates the necessity of evaporation and concentration, which in the case of spent liquors containing oxalic acid would entail decomposition of such oxalic acid.

It will be understood that the amounts of carbohydrate and of phosphoric and nitric acids are kept in a fixed ratio, or substantially so, during the oxidation taking place in the treatment vessel.

Instead of adding the carbohydrate material and the nitric acid simultaneously to a solution of phosphoric acid, as described above, I may first make an aqueous mixture of phosphoric and nitric acids, and then add the carbohydrate. This modification and others may be made without departing from the nature of my invention as set forth in the appended claims.

I claim:

1. The process of preparing oxalic acid, which consists in treating carbohydrate material with nitric acid in the presence of phosphoric acid.

2. The process of preparing oxalic acid, which consists in treating carbohydrate material with nitric acid in the presence of phosphoric acid and of a catalyzer.

3. The process of preparing oxalic acid, which consists in treating carbohydrate material with nitric acid in the presence of phosphoric acid and of vanadium pentoxid.

4. The process which consists in oxidizing carbohydrate material with nitric acid in the presence of phosphoric acid, separating the resulting oxalic acid from the spent liquor, denitrating such spent liquor, and bringing the denitrated spent liquor into absorptive contact with the fumes evolved during the oxidizing step, to form a mixture of phosphoric and nitric acid.

5. The process which consists in oxidizing carbohydrate material with nitric acid in the presence of phosphoric acid, separating the resulting oxalic acid from the spent liquor, denitrating such spent liquor, by blowing air therethrough, and bringing the denitrated spent liquor into absorptive contact with the fumes evolved during the oxidizing step and with the fumes and air from the denitration step, to form a mixture of phosphoric and nitric acids.

6. The process which consists in oxidizing carbohydrate material with nitric acid in the presence of phosphoric acid, separating the resulting oxalic acid from the spent liquor, and bringing the spent liquor into absorptive contact with the fumes evolved during the oxidizing step, to form a mixture of phosphoric and nitric acids.

7. The process which consists in oxidizing carbohydrate material with nitric acid in the presence of phosphoric acid, cooling the resulting mixture of oxalic acid and spent liquor and then separating the oxalic acid from the spent liquor, and bringing the spent liquor into absorptive contact with the fumes evolved during the oxidizing step, to form a mixture of phosphoric and nitric acids.

8. The process which consists in oxidizing carbohydrate material with nitric acid in the presence of phosphoric acid, cooling the resulting mixture of oxalic acid and spent liquor, and then separating the oxalic acid from the spent liquor, denitrating such spent liquor, and bringing the denitrated spent liquor into absorptive contact with the fumes evolved during the oxidizing step, to form a mixture of phosphoric and nitric acids.

9. The process which consists in oxidizing carbohydrate material with nitric acid in the presence of phosphoric acid, cooling the resulting mixture of oxalic acid and spent liquor and then separating the oxalic acid from the spent liquor, denitrating such spent liquor by raising its temperature and blowing air therethrough, and bringing the denitrated spent liquor into absorptive contact with the fumes evolved during the oxidizing step and with the fumes and air from the denitration step, to form a mixture of phosphoric and nitric acids.

In testimony whereof I have signed this specification.

GEORGE KOLSKY.